April 14, 1959
I. G. RIES ET AL
2,882,001
MULTIPLE SPEED TRIPOD HEAD
Filed Sept. 25, 1953
2 Sheets-Sheet 1
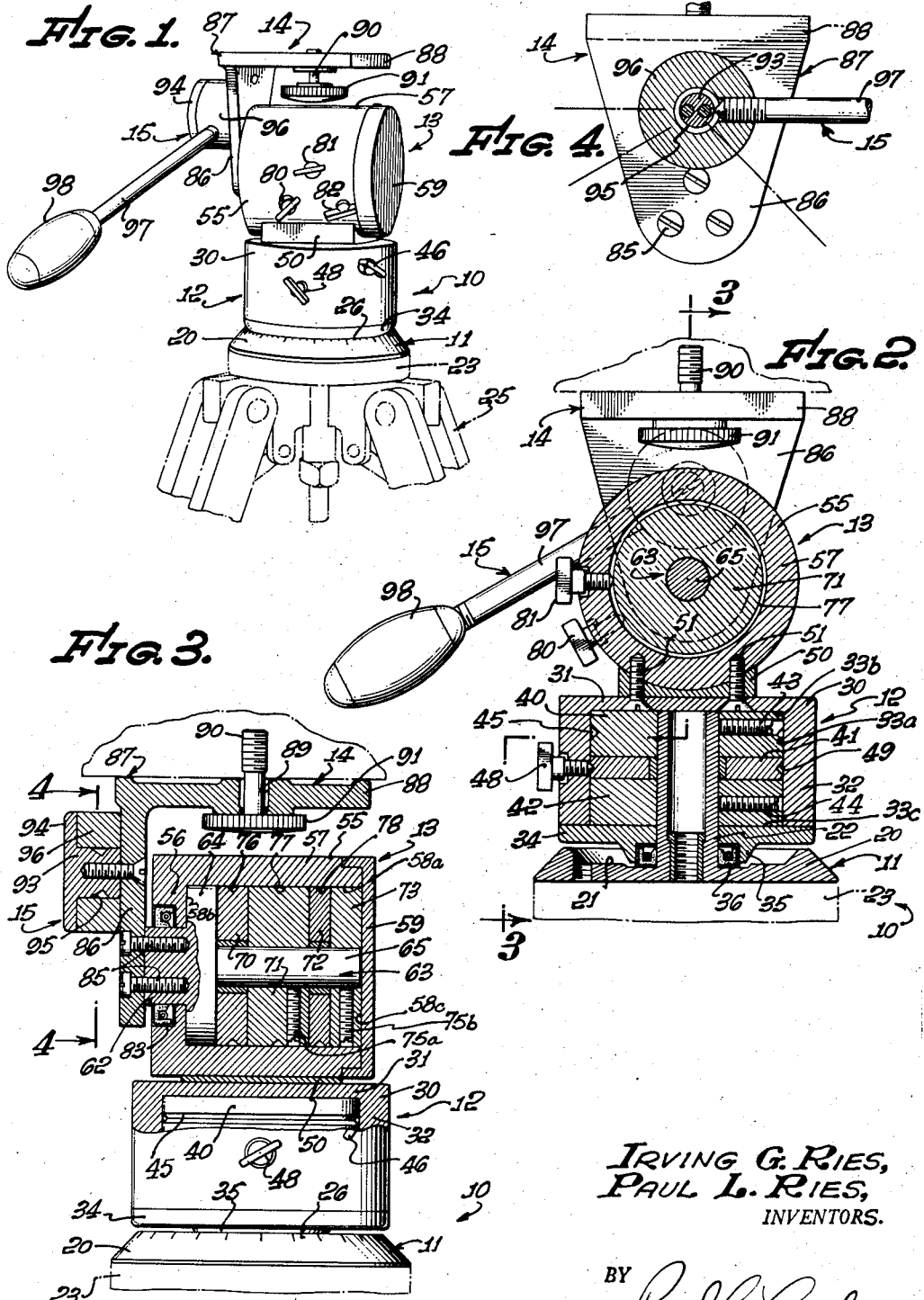
IRVING G. RIES,
PAUL L. RIES,
INVENTORS.
BY
ATTORNEY.

April 14, 1959  I. G. RIES ET AL  2,882,001
MULTIPLE SPEED TRIPOD HEAD
Filed Sept. 25, 1953  2 Sheets-Sheet 2

IRVING G. RIES,
PAUL L. RIES,
INVENTORS.

BY Reed C. Lawlor
ATTORNEY.

United States Patent Office 2,882,001
Patented Apr. 14, 1959

2,882,001

MULTIPLE SPEED TRIPOD HEAD

Irving G. Ries, Pacific Palisades, and Paul L. Ries, Los Angeles, Calif.; Miriam McGilvray, executrix of the estate of said Paul L. Ries, deceased Application September 25, 1953, Serial No. 382,354

15 Claims. (Cl. 248—183)

This invention relates generally to rotary mounting devices involving a stationary member and an element rotatable with respect to the member, and more particularly to a braking or retarding means for controlling the rotation of the rotary element. Specifically, the invention pertains to a tripod mounting or head for a camer, telescope, range-finder or other instrument having a direction axis, the mounting having adjustable friction-inducing means embodied therein for controlling the rate of tilting and/or panning of the camera or other instrument.

It is common practice when operating cameras, particularly those of the motion picture types, to mount the camera on a tripod support, the tripod having a head or holder at its upper end to which is secured the camera. The head is composed of two main members, one of which is rotatable on a vertical axis or post carried by the tripod. The other member of the head is pivotally connected to the first member on a horizontal pivot pin or axis and serves as a holder or support for the camera. By this conventional supporting structure, a universal mounting for the camera is effected so that the camera can be set in any desired fixed position or else it can be either tilted or panned, or both, as the situation requires, the adjustment of the camera from one fixed position to another or the movement of the camera in following the subject being produced by means of an operating handle projecting laterally from the holder member.

It is common knowledge that such camera mounting devices having freely rotatable members have the disadvantage of allowing excessive freedom of movement of the camera. That is to say, when the camera is mounted in a manner such that there is little or no resistance to its universal movement, the tendency is for the operator or photographer to move the camera with an oscillating or wavering motion with the result that when the developed pictures are later projected they lack steadiness and the subject appears to lurch repeatedly or to alternately advance rapidly and slowly either horizontally or vertically, or both, to the extent that smooth action and comfortable viewing are impaired. In some instances, excessive movement of the camera may even divert the camera lens to the extent that the subject is out of the field of view of the camera lens.

It is an object of this invention to provide a simple, yet highly efficient and practical tripod mounting means for a camera in which is embodied braking or retarding means by which the pivotal or rotary movement of the camera can be adjusted with precision. That is, the braking means is so constructed and arranged that various degrees of frictional resistance to movement of the camera can be readily attained in accordance with requirements of the cameraman and the conditions under which the camera is to be used. For example, when landscapes and other motionless subjects are to be photographed, the braking means may be adjusted to produce a relatively high degree of resistance to movement of the camera, and when the subject is a relatively fast moving one, the braking means may be set to apply a lesser degree of resistance to such motion. Also, the retarding means may be quickly adjusted to meet the needs of the individual using the camera so as to provide the degree of freedom of camera movement commensurate with the ability of the person to control the camera with precision, depending upon the experience, strength and steadiness of the user.

Another object of the invention is to provide a tripod head in which the holder element, to which the camera is attached, includes a horizontal spindle or shaft having one or more cylindrical flanges or stator discs arranged for rotation within a cylindrical casing or drum, which discs are adapted for frictional engagement with rotor discs disposed within the drum, coaxial with the stator discs or flanges.

Another object of the invention is to provide a braking means in which the rotor discs are arranged to either rotate freely within the drum or to be held against such rotation so as to provide additional frictional braking as the situation requires. In accordance with an object and feature of the invention, means are provided for withholding one or more of the braking discs from rotation within the drum so as to attain different selected degrees of resistance to the pivotal or rotational movement of the holder and the camera mounted thereon. Such means may be in the form of locking screws operable from the exterior of the casing to lock the rotor discs against rotation relative to the drum.

Another object of the invention is to provide a tripod mounting for a camera embodying a braking means operative to apply varying degrees of frictional resistance to panning movement of the camera about a vertical axis and to tilting movement about a horizontal axis.

A further object of the invention is to provide a tripod mounting, of the character referred to, in which a substance of high viscosity is employed in the close tolerance spaces existing between the relatively movable parts of the braking devices, this substance serving as an effective friction or braking medium between the elements and also serving as a lubricant to prevent direct abrasive action which would otherwise result in wear of the parts.

A still further object of the invention is to provide a tripod head or mount having an operating handle by which the parts of the head can be rotated in the appropriate directions to effect panning and tilting of the camera, said handle projecting laterally from the upper holder portion of the head. In accordance with another object and feature of improvement, the handle is arranged for pivotal or angular adjustment relative to the holder so that it can be located at either side of the head, thus adapting the head for operation by both right and left-hand users, or on any other position about a horizontal axis to suit the convenience of the cameraman.

A still further object of the invention is to provide a tripod head which is relatively simple in construction and thus economical to manufacture, one which is resistant to wear, one which requires a minimum of servicing or repair over long periods of time, and one which is highly practical and efficient in performing its intended function.

Further objects will appear from the following description and from the drawings, which are intended for the purpose of illustration only, and in which:

Fig. 1 is a perspective view of the upper portion of a tripod, showing the present improved tripod head mounted thereon;

Fig. 2 is a vertical sectional view through the upper portion of the tripod head;

Fig. 3 is a vertical sectional view, taken on line 3—3 of Fig. 2;

Fig. 4 is a vertical sectional view, taken on line 4—4 of Fig. 3;

Figure 5:
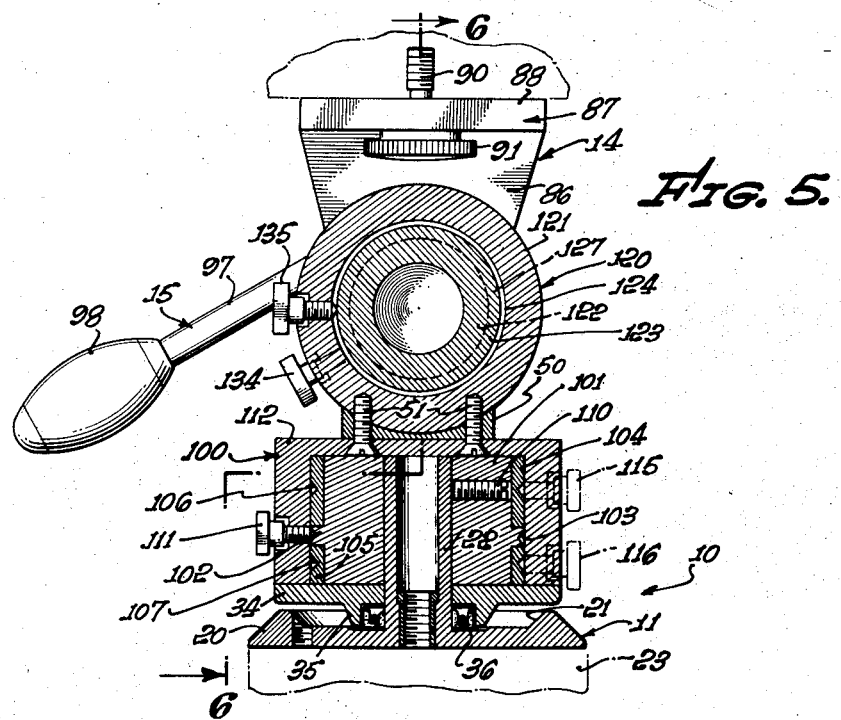
Fig. 5 is a view similar to Fig. 2, showing a tripod head of alternative construction.

The present improved tripod head is adapted for use in supporting a camera, range-finder, telescope or other instrument requiring a relatively stable, readily adjustable, support. The head comprises, in general, a base attachable to the tripod and providing a first, vertical spindle or post, a first, cylindrical, panning casing or drum rotatable on said spindle, and a plurality of annular braking elements, certain of the braking elements being secured to the fixed spindle to provide, in effect, fixed or stator brake elements, the other braking elements being secured to the drum to provide in effect movable or rotor brake elements, that rotate with the drum. One or more of the rotor brake elements are detachable from the drum so as to be freely rotatable relative thereto. The stator and rotor brake elements are arranged alternately. As a result the effective frictional resistance between the drum and the spindle may be varied by selectively locking and unlocking various rotor brake elements to the drum. In this way, the speed of panning is settable at selectively different values.

The tripod head also includes a second drum carried by and rotatable with the first drum and arranged with its axis normal to the axis of said first drum that is horizontal. Rotatable within the second, horizontal, drum is a spindle which carries a holder or mount on which the camera, telescope, range-finder or other instrument is supported for tilting movement with the spindle and holder. Arranged within the horizontal "tilt" drum is a series of stator braking elements and a series of rotor brake elements that are selectively securable to or releasable from the drum to adjust the frictional resistance to tilting movement of the camera.

Disposed within the first and second drums is a high viscosity substance which serves as a fluid friction medium between the relatively movable parts of the panning and tilting means, and sealing means are provided for avoiding leakage of the substance from the drums.

The improved panning and tilting head further includes handle means by which the holder or mount can be moved in horizontal and vertical planes. This means includes a handle projecting laterally from the holder and means for adjusting said handle angularly with respect to the holder to adapt the panning and tilting means for operation by either right- or left-hand persons and to locate the handle at angles conducive to convenience of operation.

In the following description the invention is described with particular application to a motion picture camera. However, it will be understood that it may be applied to any other instrument which has a directional axis such as telescopes, range-finders and the like which may be supported on the tripod head.

Referring first to Figs. 1 to 4 of the drawings, the tripod head 10 disclosed therein includes a base 11, a panning means 12 rotatable on the base, a tilting means 13 rotatably mounted on the panning means, a holder means 14 carried by the tilting means, and a handle means 15 associated with the holder means.

The base 11 consists of a circular plate 20 having a central recess 21 and a central tubular post 22 projecting upwardly from the recess. The base 11 is attachable to the upper apex member 23 of a tripod 25 by suitable screws, not shown. As indicated in Fig. 1, the base 11 may be provided with a protractor scale 26 on its inclined peripheral surface.

The panning means 12 is carried by the post 22 and includes a panning drum 30 of inverted cup shape having an upper end wall 31 and a depending circular wall or skirt 32 and an end plate 34 secured to the lower end thereof providing an internal braking surface including a cylindrical part 33a, an upper end part 33b and a lower end part 33c. The plate 34 has a depending flange 35 defining a recess in which is disposed an annular sealing element 36 encircling the base of the post 22.

Disposed within the panning drum 30 is a series of braking discs 40, 41 and 42, these discs fitting within the drum with close tolerances both as regards diameters and axial length. As shown in Fig. 2, the upper and lower discs 40 and 42 carry set-screws 43 and 44 by means of which these discs are secured to the fixed post 22 thus forming a pair of stator braking elements. The upper disc 40 also has a V-shaped peripheral groove 45 (Fig. 3) for receiving the inner pointed end of a locking screw 46 (Fig. 1), which is screwed into a threaded hole in the peripheral wall 32 of the drum 30.

The intermediate disc 41 is arranged either to rotate within the drum 30 and relative thereto, or to be locked to the drum for rotation therewith. The means for locking the disc 41 to the drum 30 consists of a locking screw 48 in the wall 32, said screw having an inner pointed end engageable in a V-shaped groove 49 in the periphery of the disc. The ends 31 and 34 of the drum thus serve as rotor brake elements.

A mounting block or saddle 50, of concavoplanar cross sectional shape is attached to the upper wall 31 of the drum 30 by means of screws 51 which are screwed into the periphery of a "tilting" drum 55 forming part of the tilt means 13. As shown best in Fig. 3, the drum 55 has an end wall 56 and a peripheral wall 57 and a cap 59 closing one end thereof, the drum defining an internal braking surface having a cylindrical part 58a, a first end part 58b and a second end part 58c.

The end wall 56 has a central bearing hole in which one end 62 of a spindle 63 is rotatable. The spindle has an enlarged disc portion 64 located within the drum 55, adjacent the end wall 56, and a reduced stem 65 extending coaxial within the drum. Mounted on the stem 65 is a series of brake discs 70, 71, 72 and 73 which, like the disc 64, are of a diameter closely fitting within the cylindrical wall of the drum. The discs have a combined length which is only slightly less than the length of the cylindrical braking surface 58a. A sealing element 83 fitted within a recess in the end wall 56 of the drum encircles the bearing end 62 of the spindle 63. As pointed out above, the disc 64 is integral with the spindle 63. The discs 71 and 73 carry set-screws 75 by which they are secured to the spindle stem 65 while the intervening discs 70 and 72 are loosely mounted on the stem 65. The discs 70, 71 and 72 have V-shaped peripheral grooves 76, 77 and 78 for receiving the inner pointed ends of respective locking screws 80, 81 and 82 (Figs. 1 and 2) screwed into threaded holes in the peripheral wall 57 of the drum 55. In this case the discs 64, 71 and 73 are fixed to the spindle 63 therefore acting as rotor elements and the end walls 56 and 59 of the drum and the discs 70 and 72 which are of different axial widths act as stator elements. In this case two of the stator elements 70 and 72 are attachable to the drum to vary the frictional resistance. It will be noted that the terms stator and rotor are here employed as relative terms, the term rotor referring to elements carried by the spindle and the term stator referring to elements carried by the drum.

The end 62 of the spindle 63 projects axially from the drum 55 and carries screws 85 by which the depending leg 86 of a holder element 87 is secured to the spindle for rotational or pivotal movement therewith. The element 87 of the holder means 14 has a lateral, plate-like support or shelf 88 which overlies the drum 55. The support 88 has a transverse hole 89, the lower end of which is screw-threaded. A thumb-screw 90 extends through the hole 89 to adapt it to screw into a threaded hole in the bottom of the camera (not shown) to be supported by the tripod head, the screw having a head 91 at its lower end adapted to abut the under side of the shelf 88.

Fixedly mounted against the outer side of leg 86 of the holder element 87 is a bearing element 93 having an outer flange 94. The bearing element 93 has a V-shaped peripheral groove 95. Surrounding the element 93 between the flange 94 and the leg 86 is a hub element 96 having a substantially radial, threaded hole through which the threaded end of a rod 97 is screwed, this end of the rod being pointed to adapt it to be screwed tightly into the groove 95 of the bearing element 93. The rod 97, which forms part of the handle means 15, carries a handgrip 98 at its outer end.

As previously indicated, a liquid of high viscosity is employed within the drums 30 and 55 to fill the clearance spaces existing between the adjacent faces of the various brake discs, between the endmost discs and the end walls of the drums, and between the peripheries of the discs and the internal, cylindrical braking surfaces of the drums. We have found that a silicone liquid is especially suitable for the purpose, this substance having a viscosity of 500,000 cs. at 25° C. and also having a low temperature coefficient of viscosity, a freezing temperature of approximately —40° F. and a volatilizing temperature of approximately +230° F. The silicone liquid serves as both a spacer between the relatively movable drum and disc elements and as a fluid friction medium by which a high degree of frictional braking action is produced between the braking surfaces. Such silicone liquid is particularly suited to this invention because it limits the speed of relative rotation of the various parts and minimizes lurching when there is a variation in the applied force that produces the rotation.

Assuming that the braking discs 40 and 42 are secured fast to the fixed vertical post 22 by the set-screws 43 and 44 and that the disc 41 is secured fast with the drum 30 by the locking screw 48, maximum resistance to horizontal rotation or panning of the holder means 14 and camera about a vertical axis is effected. This is attributed to the fact that the inner surfaces of the upper and lower ends 31 and 34 frictionally engage the upper and lower surfaces of the respective upper and lower fixed discs 40 and 42, further that the braking surface 33 of the drum frictionally engages the peripheries of the discs 40 and 42, and still further that the sides of the intermediate disc 41 which is now fast with the rotary drum 30, frictionally engage the adjoining sides of the fixed discs 40 and 42. When it is desired to reduce the applied frictional resistance so as to attain greater freedom of panning movement of the camera holder, the thumb screw 48 is loosened to release the disc 41. Under this condition the disc 41 becomes unrestrained and non-rotative, that is, fixed, between the discs 40 and 42 thereby eliminating the braking action between the side faces of these three discs. To lock the camera support 88 against rotation about a vertical axis in any position, the thumb screw 46 is tightened so that its inner end engages the V-shaped groove 45 of the disc 40 to which the vertical shaft 22 is fastened.

Resistance to the tilting movement of the holder and camera may be adjusted in a similar manner. Referring to Fig. 3, it is to be noted that the periphery of the disc 64 has frictional contact with the cylindrical surface 58a of the drum 55 and a side of this disc frictionally engages the end surface 58b at all times. With the discs 71 and 73 secured to the rotary spindle stem 65 by means of the set-screws 75a and 75b, and with the discs 70 and 72 locked to the drum 55 by means of the thumb screws 80 and 81, the disc 71 has frictional engagement with the braking surface 58a and with the adjacent sides of the now fixed discs 70 and 72. At the same time, the endmost disc 73 has similar engagement with the surface 58a and with the sides of the fixed disc 72 and the fixed cap 59. By this arrangement, maximum braking action is effected to minimize the possible pivotal vertical speed of the holder and camera about a horizontal axis.

By disengaging one or both of the thumb screws 80, 82, less effective braking area is made available so that less resistance to tilting of the camera is effected. The degree of frictional resistance produced when only one of the rotor discs 70 or 72 is locked to the drum 55 differs from that produced when only the other is so locked because of the differences in their widths. The difference in the frictional resistances offered by these discs may be increased by lubricating the side faces of one with a relatively high viscosity lubricant and the side faces of the other with a relatively low viscosity lubricant. It will be noted that when one of the rotor discs moves with the spindle, in effect the spindle has only two stator discs attached thereto.

In order to lock the camera support 88 against rotation about a horizontal axis in any position, the thumb screw 81 is tightened so that the inner end engages the V-shaped groove 77 of the disc 71 to which the shaft 65 is fastened.

Thus, various selected degrees of resistance can be produced by tightening or loosening one or more of the locking screws, so as to attain different speeds of panning and tilting movement of the camera, in accordance with the requirements and conditions under which the camera is to be used. If desired the camera may be panned or tilted or both actions may be produced simultaneously.

As previously indicated, the panning and tilting means of the tripod head are rotated on their respective axes by manipulating the handle means 15. Due to the effective length of the handle 97 relatively great mechanical advantage is attained. However, by controlling the relative rotation of the various discs relative to or with their respective drums, the forces applied by the operating handle are effectively offset by the frictional resistance thereby insuring convenient and practical movement of the camera to avoid excessive speed of pivotal movement of the camera. The camera lens is thus easily kept on the subject being photographed without fluctuating or wavering, thereby improving the quality of the motion pictures produced. It is to be noted that sufficient frictional resistance is maintained at all times to hold the camera in any position in which it is aimed. By this provision, the tilting means may be operated to level the camera, then the operating handle may be moved in a horizontal plane to pan the camera so as to photograph a panorama view. Conversely, by manipulating the handle in a vertical plane only, movement of the camera is limited to vertical movement when it is desired to photograph vertically moving objects, flight of aircraft, etc.

In order to provide greater ease and convenience of operation, the handle 97 may be adjusted angularly with respect to the shelf or rest 88. This is accomplished by simply loosening the rod 97 to withdraw its inner pointed end from the peripheral groove 95 of the bearing element 93, after which the handle is turned to a selected angle of inclination and the rod again tightened to cause its pointed end to engage firmly in the groove 95 to releasably lock the handle in its adjusted position. By the same procedure, the handle can be adjusted to extend laterally from either side of the tripod head, to adapt the tripod head for convenient use by either right- or left-hand persons.

It will be noted that by locking both the panning drum and the tilting drum the camera may be locked in any position desired to point it in any selected direction in space.

Figure 6:
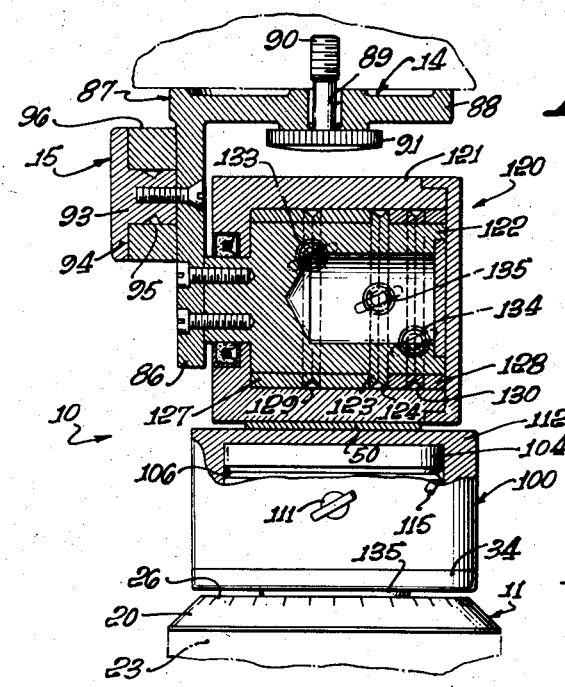
Fig. 6 is a vertical sectional view, taken on line 6—6 of Fig. 5.

Referring now to Figs. 5 and 6, our invention also contemplates an alternative form of construction of the tripod head in which the panning means 100 includes a cylindrical braking or spindle element 101 surrounding the vertical post or fixed spindle 22, this element having a peripheral flange 102 provided with a V-shaped groove 103. Surrounding the element 101 and disposed at opposite sides of the flange 102 are annular rotor braking elements 104 and 105 of different axial lengths and having respective V-shaped peripheral grooves 106 and 107. As shown, the element 101 is secured to the fixed post 22 by means of a set-screw 110. In this case a lubricant of relatively low viscosity is placed on the outer surfaces of the rotor elements 104 and 105 and the adjacent braking surface of the drum and a lubricant of relatively high viscosity is placed on the inner surfaces of the rotor elements 104 and 105 and the adjacent braking surface of the spindle element 101. A locking screw 111 on the drum 112 may be tightened to engage its pointed end in the groove 103 to lock the drum against rotation.

With the screw 111 loosened, the drum may be rotated with its upper and lower end walls in frictional contact with the upper and lower ends of the element 101. To increase the frictional resistance to rotation of the drum 112, either, or both, of a pair of thumbscrews 115 and 116 carried by the drum may be tightened to cause their inner pointed ends to engage the grooves 106 and 107 of the annular brake elements 104 and 105 and thus lock these elements to the drum. By this adjustment, either one or both of the annular elements are caused to rotate around the central element 101 in frictional contact therewith. To reduce the resistance to rotation of the drum 112, either, or both, of the elements 104 and 105 may be released to allow them to turn freely with respect to the drum.

The tilting means 120 of Fig. 6 is similar in construction to the panning means 100 of Fig. 5 in that it employs a drum 121, a center element or spindle 122 having a peripheral flange 123 provided with a V-shaped groove 124. The drum 121 is, of course, affixed to the drum 112 by the means 50, 51.

A pair of annular friction elements 127 and 128, having V-shaped peripheral grooves 129 and 130, surround the spindle 122 at opposite sides of the flange 123. The parts 122, 127 and 128 fit closely together and the assembly is closely fitted within the drum 121. The outer and inner surfaces of the rotor elements 129 and 130 are lubricated in the same manner as those of the rotor elements 104 and 105.

The spindle carries the holder means 14 and handle means 15 as in the embodiment illustrated in Figs. 1 to 3.

The tilting means 120 may be so adjusted as to attain selected degrees of frictional resistance to pivotal movement of the holder means 14 and thus, in effect, vary its permissible tilting speed. To so adjust the parts to attain such variation, thumbscrews 133 and 134, carried by the drum 121, may be selectively tightened into engagement with the grooves 129 and 130 of the braking elements 127 and 128, or loosened therefrom to meet the requirements. A similar locking screw 135 on the drum may be tightened into the groove 124 of the spindle to lock the spindle to the drum 121 and thus prevent relative rotation therebetween.

In accordance with the provisions of the patent statutes, we have described the principle of operation of the improved tripod head, together with the constructions which we now consider to represent the best embodiments thereof but we wish to have it understood that other modifications may be made without departing from the spirit of the invention. Consequently, it will be understood that our invention is not limited to the embodiments thereof that are illustrated and described herein, but includes all other embodiments thereof within the scope of the appended claims.

We claim as our invention:

1. In a tripod head: a holder means; and means rotatably supporting said holder means, said supporting means including: a drum having an internal braking surface defined by the inner side walls thereof; a spindle disposed coaxially within the drum, said drum and said spindle being relatively rotatable; a plurality of annular brake discs disposed within the drum and surrounding said spindle, said brake discs being arranged in side-by-side abutting relation, certain of said brake discs being secured to said spindle; means operative to radially interlock any of the remaining brake discs to the side walls of said drum; and operating means for effecting relative rotation between said spindle and said drum.

2. A tripod head as defined in claim 1 in which a body of relatively heavy lubricant is located on the mutually braking surfaces between said braking surface and at least one of said brake discs and a body of relatively light lubricant is located on the mutually braking surfaces between said braking surface and at least one other of said brake discs.

3. In a tripod head: a holder means; and means rotatably supporting said holder means, said supporting means including: a drum; a spindle disposed coaxially within the drum, said drum and said spindle being relatively rotatable; a plurality of first brake elements and a plurality of second brake elements alternately disposed within the drum and surrounding said spindle, said first brake elements being secured to said spindle; means operative to radially interlock any or all of said second brake elements to the side walls of said drum to adjust the frictional resistance between said drum and said spindle; and operating means for effecting relative rotation between said spindle and said drum.

4. In a tripod head: a holder means; and means rotatably supporting said holder means, said supporting means including: a drum having an internal braking surface; a spindle disposed coaxially within the drum, said drum and said spindle being relatively rotatable; a first annular brake disc element secured to said spindle; a second annular brake element surrounding said spindle and having one part of its surface frictionally engaging said braking surface of said drum and having another part of its surface frictionally engaging said first brake element; a first locking means operative to selectively lock said first brake element to said drum so as to prevent relative rotation between said spindle and said drum; and a second locking means operative to selectively lock said second brake element to said drum and to release it therefrom so as to vary the frictional force between said drum and said spindle during relative rotation thereof.

5. In a tripod head: a holder means; and means rotatably supporting said holder means, said supporting means including: a drum having an internal braking surface; a spindle disposed coaxially within the drum, said drum and said spindle being relatively rotatable; a first annular brake disc element secured to said spindle and having its periphery in frictional engagement with said braking surface; a second annular brake element surrounding said spindle and having its inner circular surface frictionally engaging the periphery of said spindle and having its periphery frictionally engaging said braking surface of said drum and having an end face frictionally engaging an end face of said first brake element; a first locking means operative to selectively lock said first brake element to said drum so as to prevent relative rotation between said spindle and said drum; and a second locking means operative to selectively lock said second brake element to said drum and to release it therefrom so as to vary the frictional force between said drum and said spindle during relative rotation thereof.

6. A panning and tilting head for use on a tripod, comprising: a first, panning, drum having a substantially vertical axis; a first, panning spindle disposed coaxial within said drum, said spindle and said drum being relatively rotatable; a first, panning brake element secured to said spindle; a second, panning brake element surrounding said sipindle and frictionally engageable with said drum and said first brake disc, said second panning brake element being securable to said drum; a second, tilt, drum associated with said panning drum and having a substantially horizontal axis; a second, tilt spindle disposed coaxial within said tilt drum, said tilt drum and said tilt spindle being relatively rotatable; a first tilt brake element secured to said tilt spindle; and a second tilt brake element surrounding said tilt spindle and frictionally engageable with said tilt drum and said first tilt brake element, said second tilt brake element being securable to said tilt drum; a rotatable part of one drum and spindle assembly being rigidly attached to a rotatable part of the other drum and spindle assembly; an instrument holder means operatively connected to the remaining rotatable part of said one drum and spindle assembly; means for attaching the remaining rotatable part of the other drum and spindle assembly to a tripod; and handle means on said holder means operable to pan and tilt the same.

7. A panning and tilting head for use on a tripod, comprising: a first, panning, drum having a substantially vertical axis; a first, panning spindle disposed coaxially within said drum, said spindle and said drum being relatively rotatable; a first, panning brake element secured to said spindle and having frictional contact with said drum; a second, panning brake element surrounding said spindle and frictionally engageable with said spindle, said drum and said first panning brake element, said second panning brake element being securable to said drum; a second, tilt, drum associated with said panning drum and having a substantially horizontal axis; a second, tilt spindle disposed coaxially within said tilt drum, said tilt drum and said tilt spindle being relatively rotatable; a first tilt brake element secured to said tilt spindle and having frictional contact with said tilt drum; and a second tilt brake element surrounding said tilt spindle and frictionally engageable with said tilt spindle, said tilt drum and said first tilt brake element, said second tilt brake element being securable to said tilt drum; a rotatable part of one drum and spindle assembly being rigidly attached to a rotatable part of the other drum and spindle assembly; an instrument holder means operatively connected to the remaining rotatable part of said tilt drum and spindle assembly; means for attaching the remaining rotatable part of the other drum and spindle assembly to a tripod; and handle means on said holder means operable to pan and tilt the same.

8. A panning and tilting head for use on a tripod, comprising: a first, panning, drum having a substantially vertical axis; a first, panning spindle disposed coaxial within said drum, said spindle and said drum being relatively rotatable; a first, panning brake element secured to said spindle; a second, panning brake element surrounding said spindle and frictionally engageable with said drum and said first brake disc, said second panning brake element being securable to said drum; a second tilt, drum associated with said panning drum and having a substantially horizontal axis; a second, tilt spindle disposed coaxial within said tilt drum, said tilt drum and said tilt spindle being relatively rotatable; a first tilt brake element secured to said tilt spindle; and a second tilt brake element surrounding said tilt spindle and frictionally engageable with said tilt drum and said first tilt brake element, said second tilt brake element being securable to said tilt drum; a rotatable part of one drum and spindle assembly being rigidly attached to a rotatable part of the other drum and spindle assembly; an instrument holder means operatively connected to the remaining rotatable part of said one drum and spindle assembly; means for attaching the remaining rotatable part of the other drum and spindle assembly to a tripod; and handle means connected for angular adjustment on said holder means operable to pan and tilt the same.

9. A panning and tilting head for use on a tripod, comprising: a base attachable to a tripod and having a substantially vertical post; a panning drum rotatable about said post; a plurality of panning brake elements disposed within said drum and surrounding said post, certain of said panning brake elements being secured to said post and certain of said panning brake elements being selectively securable to said drum, frictional contact between said panning brake elements, and between said panning brake elements and said drum, effecting frictional resistance to rotation of said panning drum; a tilt drum carried by said panning drum and having a substantially horizontal axis; a tilt spindle rotatable within said tilt drum; a plurality of tilt brake elements disposed within said tilt drum and surrounding said spindle, certain of said tilt brake elements being secured to said spindle and certain of said tilt brake elements being securable to said tilt drum, frictional contact between said tilt brake elements, and between said tilt brake elements and said drum, effecting frictional resistance to rotation of said spindle; an instrument holder means carried by said tilt spindle; and handle means operatively connected to and angularly adjustable with respect to said holder means for panning and tilting the same against the friction resistance offered by said panning and tilting brake elements.

10. A panning and tilting head for use on a tripod, comprising: a base attachable to a tripod and having a substantially vertical post; a panning drum rotatable about said post; a plurality of panning brake elements disposed within said drum and surrounding said post, certain of said panning brake elements being secured to said post and certain of said panning brake elements being selectively securable to said drum between said first-mentioned panning brake elements, frictional contact between said panning brake elements, and between said panning brake elements and said drum, effecting frictional resistance to rotation of said panning drum; a tilt drum carried by said panning drum and having a substantially horizontal axis; a tilt spindle rotatable within said tilt drum; a plurality of tilt brake elements disposed within said tilt drum and surrounding said spindle, certain of said tilt brake elements being secured to said spindle and certain of said tilt brake elements being securable to said tilt drum between said first-mentioned tilt brake elements, frictional contact between said tilt brake elements, and between said tilt brake elements and said drum, effecting frictional resistance to rotation of said spindle; an instrument holder means carried by said tilt spindle; and handle means operatively connected to and angularly adjustable with respect to said holder means for panning and tilting the same against the friction resistance offered by said panning and tilting brake elements.

11. A panning and tilting head for use on a tripod, comprising: a base attachable to a tripod and having a substantially vertical post; a panning drum rotatable about said post; a plurality of panning brake elements disposed within said drum and surrounding said post, certain of said panning brake elements being secured to said post and certain of said panning brake elements being selectively securable to said drum, frictional contact between said panning brake elements, and between said panning brake elements and said drum, effecting frictional resistance to rotation of said panning drum; a tilt drum carried by said panning drum and having a substantially horizontal axis; a tilt spindle rotatable within said tilt drum; a plurality of tilt brake elements disposed within said tilt drum and surrounding said spindle, certain of said tilt brake elements being secured to said spindle and certain of said tilt brake elements being securable to said tilt drum, frictional contact between said tilt brake elements, and between said tilt brake elements and said drum, effecting frictional resistance to rotation of said spindle; an instrument holder means carried by said tilt spindle; and handle means operatively connected to and angularly adjustable with respect to said holder means for panning and tilting the same against the friction resistance offered by said panning and tilting brake elements; and a fluid medium of relatively high viscosity within said panning and tilt drums and disposed in the clearance spaces existing between these drums and the parts enclosed thereby.

12. In a tripod head including a drum member having end walls and having an internal braking surface, and a spindle member coaxial with the drum member, one of said members being rotatable relative to the other member: a plurality of annular brake elements within said drum member and surrounding said spindle member, at least one of said elements being secured to said spindle member and at least one of said elements being radially securable to said drum member to effect relative rotation therebetween, said disc elements being in frictional engagement, one with another, all of said disc elements having frictional engagement with said braking surface, and the endmost disc elements having frictional engagement with said end walls.

13. A tripod head as defined in claim 12, including means for securing certain of said brake elements to said drum member, said securing means consisting of a screw carried by said drum member and engageable in a peripheral groove of said brake element securable to said drum member.

14. A tripod head including: a drum member having end walls and an internal braking surface; a spindle member coaxial within the drum member, said spindle member formed with a flange having peripheral frictional contact with said braking surface, said members being relatively rotatable; a first annular brake element surrounding said spindle member at one side of its said flange and having frictional engagement with said flange, with a said end wall, and with said braking surface; a second annular brake element surrounding said spindle member at the other side of said flange and having frictional engagement with said flange, with the other end wall and with said braking surface; a first locking means on said drum member engageable with said brake elements to withhold the same from rotation relative to said drum member; and a second locking means on said drum member engageable with said flange to lock said drum and spindle elements against relative rotation.

15. In a tripod head including a drum member having end walls and having an internal braking surface, and a spindle member co-axial with the drum member, one of said members being rotatable to the other; a plurality of annular brake elements within said drum member and surrounding said spindle member, at least one of said elements being secured to said spindle member and at least one of said elements being radially securable to said drum member to effect relative rotation therebetween, said brake elements being in frictional engagement, one with another, all of said brake elements having frictional engagement with said braking surface, and the endmost brake elements having frictional engagement with said end walls; and, means for securing certain of said brake elements to said drum member, said securing means consisting of a screw carried by said drum member and engageable in a peripheral groove of said brake element securable to said drum member.

References Cited in the file of this patent

UNITED STATES PATENTS

| | | |
|---|---|---|
| 1,898,469 | Tonsor | Feb. 21, 1933 |
| 2,111,012 | Tondreau | Mar. 15, 1938 |
| 2,377,541 | Crampton | June 5, 1945 |
| 2,459,040 | Miller | Jan. 11, 1949 |
| 2,654,621 | Wister | Oct. 6, 1953 |